(12) United States Patent
Call et al.

(10) Patent No.: US 6,921,608 B2
(45) Date of Patent: Jul. 26, 2005

(54) BATTERY SEPARATOR

(75) Inventors: Ronald W. Call, Rock Hill, SC (US); J. Robert Dees, Charlotte, NC (US); Shizuo Ogura, Charlotte, NC (US); Donald K. Simmons, Charlotte, NC (US); Xiangyun Wei, Charlotte, NC (US)

(73) Assignee: Celgard, Inc., Charlotte, NC (US)

( * ) Notice: Subject to any disclaimer, the term of this patent is extended or adjusted under 35 U.S.C. 154(b) by 178 days.

(21) Appl. No.: 10/225,018

(22) Filed: Aug. 21, 2002

(65) Prior Publication Data

US 2003/0099877 A1 May 29, 2003

Related U.S. Application Data

(63) Continuation-in-part of application No. 09/614,500, filed on Jul. 11, 2000, now abandoned.

(51) Int. Cl.[7] ................................................ H01M 8/00
(52) U.S. Cl. ..................... 429/129; 429/145; 29/623.1
(58) Field of Search ........................... 429/129, 249, 429/142, 144, 145, 132, 133; 29/623.1, 623.4; 264/171.11, 175, 288.4

(56) References Cited

U.S. PATENT DOCUMENTS

| | | |
|---|---|---|
| 5,565,281 A | 10/1996 | Yu et al. |
| 5,667,911 A | 9/1997 | Yu et al. |
| 5,922,492 A | 7/1999 | Takita et al. |
| 5,952,120 A | 9/1999 | Yu et al. |

OTHER PUBLICATIONS

U.S. Appl. No. 09/484,184, filed Jan. 18, 2002, Call et al.

Berins, M.L., Plastics Engineering Handbook, 5th Edition, Chapman & Hall, New York, NY (1991), pp. 102–105.

*Primary Examiner*—Michael Barr
*Assistant Examiner*—Monique Wills
(74) *Attorney, Agent, or Firm*—Robert H. Hammer, III, P.C.

(57) ABSTRACT

The present invention is directed to a battery separator. The battery separator comprises a microporous film having a first portion and a second portion. The first portion is bonded to the second portion. The bond has a strength greater than 5 g/in. The film has a thickness less than 1.7 mils, a Gurley of less than 50 sec/10 cc, and a puncture strength of greater than 400 g/mil.

13 Claims, No Drawings

BATTERY SEPARATOR

RELATED APPLICATION

This application is a continuation-in-part of application Ser. No. 09/614,500 filed Jul. 11, 2000 now abandoned.

FIELD OF THE INVENTION

This invention is related to a battery separator having improved strength properties and the method for making same.

BACKGROUND OF THE INVENTION

In U.S. patent application Ser. No. 09/484,184 filed Jan. 18, 2000 (incorporated herein by reference), a battery separator made by a "collapsed bubble" technique is disclosed. "Collapsed bubble" technique refers to a variation of the known blown film extrusion technique for making films. In blown film extrusion, polymer is extruded through an annular die to form a "bubble," the bubble is cooled and collapsed, but the collapsed bubble does not permanently adhere to itself. See: Berins, M. L., Ed., *Plastics Engineering Handbook*, 5$^{th}$ Edition, Chapman & Hall, New York, N.Y. (1991) pp. 102–105, incorporated herein by reference. In the "collapsed bubble" technique, when the bubble is collapsed onto itself, it is designed to permanently adhere to itself. In the forementioned application, the extruded polymer is a co-extruded polymer, i.e. two distinct polymers forming two distinct layers.

Celgard® 2402 and 2502 flat sheet membranes are pre-existing products made by a "collapsed bubble" technique. The relevant properties of these membranes are set out in Table 2 below. Celgard® 2400, 2500, and 849 flat sheet membranes are pre-existing products made by a blown film extrusion technique. The relevant properties of these membranes are set out in Tables 1 and 2. Celgard® 2400 and 2500 are related to Celgard® 2402 and 2502 in that the latter two products are collapsed bubble variants of the former products and are twice as thick as the former two products.

In U.S. Pat. No. 5,565,281, there is disclosed a bilayer battery separator, one layer has strength capabilities and the other layer has shutdown capabilities. The two independently made layers are bonded together.

In U.S. Pat. No. 5,667,911, a cross-plied battery separator is disclosed. In this separator, uniaxially oriented plies are bonded together so that they are angularly biased (i.e., an angle of between 20° and 90° between the uniaxial orientation of each ply).

In U.S. Pat. No. 5,922,492, a composite battery separator is disclosed. This separator joins together to different materials, a microporous membrane and a nonwoven fabric are joined by lamination.

In U.S. Pat. No. 5,952,120, a trilayer battery separator having two strength layers sandwiching a shutdown layer is disclosed.

SUMMARY OF THE INVENTION

The present invention is directed to a battery separator. The battery separator comprises a microporous film having a first portion and a second portion. The first portion is bonded to the second portion. The bond has a strength greater than 5 g/in. The film has a thickness less than 1.7 mils, a Gurley of less than 50 sec/10 cc, and a puncture strength of greater than 400 g/mil.

DESCRIPTION OF THE INVENTION

The present invention provides a microporous battery separator having two portions bonded together. Each portion consists of a non-coextruded layer and is made of the same material. To obtain greater puncture strength over the prior art separator, that is single multilayer separator of a given thickness, the instant invention bonds together the two portions that are sized, when combined, to have the same thickness of a prior art separator. The instant invention is, preferably, made by a collapsed bubble technique; i.e. a blown film technique in which a single molten polymer (or blend of polymers) is extruded through an annular die, the bubble which issues from the die has a first portion and a second portion (each portion representing roughly one-half of the circumference of the bubble), and then the bubble is collapsed onto itself and bonded prior to micropore formation (preferably by annealing and stretching). When the bubble issues from the die, it is substantially oriented in the machine direction. Thus, when the bubble is collapsed onto itself and bonded, the first portion and the second portion are oriented in substantially the same direction (angular bias between oriented portions being less than 15°), i.e., without significant angular bias between the first portion and the second portion (such as disclosed in U.S. Pat. No. 5,667,911). Collapsing and bonding are performed in the same step by allowing the molten (or near molten) polymer of the bubble to knit together. By collapsing the bubble onto itself and bonding same, increased puncture strength is obtained at thicknesses which are equivalent to prior art separators.

By the foregoing technique, the first portion and the second portion, which when bonded provide the precursor for the micropore formation process (e.g. an anneal and stretch operation), are made of the same material. Materials are generally polyolefins, preferably polyethylene or polypropylene, copolymers thereof, and mixtures thereof, and most preferably polyethylene and polypropylene.

The ultimate separator produced after annealing and stretching is a microporous film. Microporous, as is used herein, refers to films having a porosity of less than 60 percent and an average pore size between 0.005–10 microns. Preferably, the film has a porosity of 20–60 percent and an average pore size of 0.01–5 microns, and most preferably a porosity of 30–50 percent and an average pore size of 0.5–2 microns.

The separator has a thickness of less than 1.7 mils, and preferably a thickness in the range of 0.5–1.5 mils.

The separator has a Gurley, which is measured by ASTM-D726 using 10 cc of air at 12.2 inches of water, of less than 50 sec/10 cc. Preferably, the Gurley is less than 45 sec/10 cc, and most preferred, less than 35 sec/10 cc.

The separator has a puncture strength, which is determined by averaging 10 measurements across the width of the final product using a Mitech Stevens LFRA texture analyzer and a needle with a 1.65 mm diameter and a 0.5 mm radius recording data at a rate of 2 mm/sec with a maximum amount of deflection of 6 mm, greater than 400 grams per mil.

As mentioned above, the film is made by a collapsed bubble technique using a Celgard type process (extrude, anneal, stretch). Further details are set for in the examples given below.

In Table I, commercially available Celgard product 849 is compared to the invention. All products were made by the same process, except that the line speed was increased for the inventive examples so that the thickness could be matched.

TABLE I

| example id # | 849 | pe1 | pe2 | pe3 |
|---|---|---|---|---|
| resin | HDPE | HDPE | HDPE | HDPE |
| product film | pe-single | pe/pe | pe/pe | pe/pe |
| thickness (mil) | 1.1 | 1.22 | 1.23 | 1.23 |
| gurley (sec/10 cc air) | 36–51 | 21 | 23 | 33–34 |
| puncture strength (g/mil) | 380–400 | 450 | 440–460 | 460–480 |
| adhesion (g/inch) | | 42 | 46 | 51 |

In Table II, commercially available Celgard products 2400, 2402, 2500, and 2502 are compared to the invention. All products were made by substantially the same process, except that the line speed was increased for the inventive examples so that the thickness could be matched.

TABLE II

| example id # | 2400 | 2402 | 2500 | 2502 | pp1 | pp2 | pp3 | pp4 |
|---|---|---|---|---|---|---|---|---|
| resin | PP | PP | PP | PP | PP | PP | PP | PP |
| product film | pp-single | pp/pp | pp-single | pp/pp | pp/pp | pp/pp | pp/pp | pp/pp |
| thickness (mil) | 1 | 2 | 1 | 2 | 1 | 1 | 0.68 | 0.65 |
| gurley (sec/10 cc air) | 23–29 | 40–90 | 7–10 | 14–26 | 19–23 | 21–25 | 8–10 | 9–12 |
| puncture strength (g/mil) | 400–450 | 350–390 | 300–350 | 250–300 | 490–540 | 540–590 | 470–520 | 530–580 |
| adhesion (g/inch) | n/a | | n/a | 5 | >20 | >20 | >20 | >20 |

The present invention may be embodied in other forms without departing from the spirit and the essential attributes thereof, and, accordingly, reference should be made to the appended claims, rather than to the foregoing specification, as indicated the scope of the invention.

What is claimed is:

1. A battery separator comprising:
    a microporous film having
        a first non-coextruded portion, and
        a second non-coextruded portion, said first portion being bonded directly to said second portion, said bond having a strength greater than 5 g/in, and said first portion and said second portion being made of the same material and being oriented in substantially the same direction; and said film having
    a thickness less than 1.5 mils
        a Gurley of less than 50 sec/10 cc, and
        a puncture strength of greater than 400 g/mil.

2. The battery separator according to claim 1 wherein said microporous film having a porosity less than 60% and an average pore size between 0.005 –10 microns.

3. The battery separator according to claim 2 wherein said film having a porosity ranging from 20 –60% and an average pore size ranging from 0.01 –5 microns.

4. The battery separator according to claim 3 wherein said film having a porosity ranging from 30 –50% and an average pore size ranging from 0.05 –2.

5. The battery separator according to claim 1 wherein said thickness ranges from 0.5 –1.5 mils.

6. The battery separator according to claim 1 wherein said Gurley being less than 50 sec/10 cc.

7. The battery separator according to claim 1 wherein said Gurley being less than 45 sec/10 cc.

8. The battery separator according to claim 1 wherein said Gurley being less than 35 sec/10 cc.

9. The battery separator according to claim 1 wherein said puncture strength being greater than 425 grams/mil.

10. The battery separator according to claim 1 wherein said material being a polyolefin.

11. The battery separator according to claim 10 wherein said polyolefin being selected from the group consisting of polyethylene, polypropylene, copolymers thereof and mixtures thereof.

12. The battery separator according to claim 1 wherein said bond strength being greater than 15 grams/inch.

13. The battery separator according to claim 1 wherein said first portion and said second portion being formed from a collapsed bubble.

* * * * *